US008346397B2

(12) United States Patent
Harrod et al.

(10) Patent No.: US 8,346,397 B2
(45) Date of Patent: Jan. 1, 2013

(54) AIRFLOW ADJUSTMENT USER INTERFACES

(75) Inventors: Gregory Ralph Harrod, Wichita, KS (US); Amanda L. Slavens, Guthrie, OK (US); Jedidiah O. Bentz, Wichita, KS (US); Grant E. Carmichael, Grand Rapids, MI (US); Bradley A. Beers, Dorr, MI (US); Nathan T. Ostrye, Wichita, KS (US)

(73) Assignee: Johnson Controls Technology Company, Holland, MI (US)

( * ) Notice: Subject to any disclaimer, the term of this patent is extended or adjusted under 35 U.S.C. 154(b) by 579 days.

(21) Appl. No.: 12/560,216

(22) Filed: Sep. 15, 2009

(65) Prior Publication Data

US 2010/0070085 A1 Mar. 18, 2010

Related U.S. Application Data

(60) Provisional application No. 61/097,133, filed on Sep. 15, 2008.

(51) Int. Cl.
G05B 21/00 (2006.01)
G05B 13/00 (2006.01)
G01M 1/38 (2006.01)

(52) U.S. Cl. ........................................ 700/276; 700/246
(58) Field of Classification Search ................. 700/246, 700/276
See application file for complete search history.

(56) References Cited

U.S. PATENT DOCUMENTS

| | | | |
|---|---|---|---|
| 4,616,325 A * | 10/1986 | Heckenbach et al. | 700/276 |
| 4,711,394 A * | 12/1987 | Samuel | 236/49.3 |
| 5,305,953 A | 4/1994 | Rayburn et al. | |
| 5,402,845 A | 4/1995 | Jeffery et al. | |
| 5,417,077 A | 5/1995 | Jeffery et al. | |
| 5,417,368 A | 5/1995 | Jeffery et al. | |
| 5,656,912 A * | 8/1997 | Yang | 318/808 |
| 5,768,121 A * | 6/1998 | Federspiel | 700/28 |
| 5,875,109 A * | 2/1999 | Federspiel | 700/40 |
| 6,006,142 A * | 12/1999 | Seem et al. | 700/276 |
| 6,070,110 A | 5/2000 | Shah et al. | |
| 6,155,341 A | 12/2000 | Thompson et al. | |
| 6,408,228 B1 * | 6/2002 | Seem et al. | 700/276 |
| 6,449,533 B1 | 9/2002 | Mueller et al. | |
| 6,619,555 B2 | 9/2003 | Rosen | |
| 6,621,507 B1 | 9/2003 | Shah | |
| 6,824,069 B2 | 11/2004 | Rosen | |
| 6,848,263 B2 * | 2/2005 | Hafner et al. | 62/127 |
| 6,934,643 B2 * | 8/2005 | Kar et al. | 702/50 |
| 6,994,620 B2 | 2/2006 | Mills | |
| 7,000,849 B2 | 2/2006 | Ashworth et al. | |
| 7,017,827 B2 | 3/2006 | Shah et al. | |
| 7,114,554 B2 | 10/2006 | Bergman et al. | |
| 7,152,806 B1 | 12/2006 | Rosen | |
| 7,156,316 B2 | 1/2007 | Kates | |
| 7,177,776 B2 * | 2/2007 | Whitehead | 702/118 |
| 7,188,002 B2 | 3/2007 | Chapman, Jr. et al. | |
| 7,212,887 B2 | 5/2007 | Shah et al | |

(Continued)

Primary Examiner — Mohammad Ali
Assistant Examiner — Kelvin Booker
(74) Attorney, Agent, or Firm — Fletcher Yoder

(57) ABSTRACT

Controllers for controlling heating, ventilating, air conditioning, and cooling (HVAC) systems are provided. The controllers include graphical user interfaces for user adjustment of system settings. The graphical user interfaces also may be designed to present information that facilitates user understanding of system operations. In certain embodiments, the controllers may allow users to adjust airflow values within a wide range of values. In these embodiments, the graphical user interfaces may include slide bars for adjusting the airflow values.

20 Claims, 8 Drawing Sheets

U.S. PATENT DOCUMENTS

| | | |
|---|---|---|
| 7,222,494 B2 | 5/2007 | Peterson et al. |
| 7,225,054 B2 | 5/2007 | Amundson et al. |
| 7,243,004 B2 | 7/2007 | Shah et al. |
| 7,246,997 B2 * | 7/2007 | Liu et al. ................. 415/204 |
| 7,287,709 B2 | 10/2007 | Proffitt et al. |
| 7,308,384 B2 | 12/2007 | Shah et al. |
| 7,364,353 B2 | 4/2008 | Kolk |
| 7,460,933 B2 | 12/2008 | Chapman, Jr. et al. |
| 7,584,024 B2 * | 9/2009 | Wroblewski et al. ......... 700/300 |
| 7,653,459 B2 * | 1/2010 | Pouchak et al. .............. 700/276 |
| 7,726,582 B2 * | 6/2010 | Federspiel .................... 700/276 |
| 7,795,827 B2 * | 9/2010 | Jeung ....................... 318/400.04 |
| 7,890,215 B2 * | 2/2011 | Duncan ........................ 700/276 |
| 8,020,777 B2 * | 9/2011 | Kates ........................... 700/276 |
| 8,041,460 B2 * | 10/2011 | Klinger et al. ................ 700/277 |
| 8,049,447 B2 * | 11/2011 | Jeung ....................... 318/400.04 |
| 8,072,167 B2 * | 12/2011 | Jeung ....................... 318/400.17 |
| 8,170,720 B2 * | 5/2012 | Amundson et al. ........... 700/276 |
| 8,190,273 B1 * | 5/2012 | Federspiel et al. ............. 700/17 |
| 2003/0070437 A1 * | 4/2003 | Hafner et al. .................. 62/127 |
| 2004/0249597 A1 * | 12/2004 | Whitehead ................... 702/118 |
| 2004/0260483 A1 * | 12/2004 | Kar et al. ....................... 702/45 |
| 2005/0119766 A1 | 6/2005 | Amundson et al. |
| 2005/0187664 A1 * | 8/2005 | Bash et al. .................... 700/276 |
| 2005/0278071 A1 * | 12/2005 | Durham ........................ 700/276 |
| 2006/0004492 A1 * | 1/2006 | Terlson et al. ................ 700/276 |
| 2006/0161306 A1 * | 7/2006 | Federspiel .................... 700/276 |
| 2006/0178762 A1 * | 8/2006 | Wroblewski et al. ........... 700/30 |
| 2006/0192021 A1 | 8/2006 | Schultz et al. |
| 2007/0209653 A1 * | 9/2007 | Beisheim et al. ............... 126/80 |
| 2008/0004725 A1 * | 1/2008 | Wacker ........................... 700/83 |
| 2008/0004754 A1 * | 1/2008 | Pouchak et al. .............. 700/276 |
| 2008/0015739 A1 * | 1/2008 | Wacker ......................... 700/276 |
| 2008/0015740 A1 * | 1/2008 | Osann ........................... 700/276 |
| 2008/0161975 A1 * | 7/2008 | Stanimirovic ................ 700/276 |
| 2008/0161976 A1 * | 7/2008 | Stanimirovic ................ 700/276 |
| 2009/0090115 A1 | 4/2009 | Boydstun et al. |
| 2009/0215375 A1 * | 8/2009 | Hagensen ..................... 700/275 |
| 2009/0216383 A1 * | 8/2009 | Klinger et al. ................ 700/276 |
| 2009/0254225 A1 * | 10/2009 | Boucher et al. ............... 700/295 |
| 2010/0057258 A1 * | 3/2010 | Clanin .......................... 700/276 |
| 2010/0082161 A1 * | 4/2010 | Patch ............................ 700/276 |
| 2010/0106328 A1 * | 4/2010 | Li et al. ......................... 700/276 |
| 2010/0305761 A1 * | 12/2010 | Remsburg ..................... 700/277 |
| 2011/0077758 A1 * | 3/2011 | Tran et al. ...................... 700/94 |
| 2011/0172828 A1 * | 7/2011 | Schmidt et al. ............... 700/276 |
| 2012/0083194 A1 * | 4/2012 | Hagensen et al. .............. 454/16 |
| 2012/0115408 A1 * | 5/2012 | Hagensen ..................... 454/251 |

* cited by examiner

AIRFLOW ADJUSTMENT USER INTERFACES

CROSS REFERENCE TO RELATED APPLICATIONS

This application claims priority from and the benefit of U.S. Provisional Application Ser. No. 61/097,133, entitled "CONTROLLER AND ASSOCIATED USER INTERFACE FOR CLIMATE CONDITIONING SYSTEM", filed Sep. 15, 2008, which is hereby incorporated by reference.

BACKGROUND

The invention relates generally to heating, ventilating, air conditioning, and refrigeration systems, and controllers for configuring these systems.

A wide range of applications exist for heating, ventilating, and air conditioning (HVAC) systems. For example, residential, light commercial, commercial, and industrial systems are used to control temperatures and air quality in residences and buildings. Such systems often are dedicated to either heating or cooling, although systems are common that perform both of these functions. Very generally, these systems operate by implementing a thermal cycle in which fluids are heated and cooled to provide the desired temperature in a controlled space, typically the inside of a residence or building. Similar systems are used for vehicle heating and cooling, and as well as for general refrigeration.

Residential systems generally include an indoor unit, such as an air handler or a furnace, and an outdoor unit, such as a heat pump or an air conditioner. A system controller, such as a thermostat, may be connected to control circuits within the indoor and outdoor units to control operation of the HVAC system. A user may adjust operating parameters of the HVAC system, such as the temperature of a heated or cooled space, through a user interface. However, in certain applications, the user interface may not allow for adjustment of more complex parameters. Further, a user may not understand how to adjust all but the simplest system parameters or how the components of the HVAC system function together.

SUMMARY

The present invention relates to a control device that includes a communication interface suitable for operable connection to an indoor unit that directs conditioned air to an environment and at least one of a heat pump, an air conditioner, or an auxiliary heating system and a display capable of displaying a maximum airflow setting, a minimum airflow setting, and a range therebetween of incremental airflow settings for the heat pump, the air conditioner, or the auxiliary heating system. The control device also includes a graphical user interface capable of receiving a user input that selects one of the incremental airflow settings and a processor capable of applying the selected incremental airflow setting to the indoor unit through the communication interface to control flow of the conditioned air based upon the selected incremental setting.

The present invention also relates to a control device that includes a communication interface suitable for operable connection to a heating, ventilating, air conditioning, or cooling system and a display capable of displaying a graphical element defining a range of incremental airflow settings extending between a maximum airflow setting and a minimum airflow setting for a unit of the heating, ventilating, air conditioning, or cooling system, and a moveable feature disposed on the graphical element. The control device also includes a graphical user interface capable of receiving a user input that moves the moveable feature on the graphical element to select an incremental airflow setting for the unit and a processor capable of applying the selected incremental airflow setting to the unit.

The present invention further relates to a method that includes displaying maximum and minimum airflow settings for a heating, ventilating, air conditioning, or cooling system and a graphical element representing a plurality of incremental airflow settings between the maximum and minimum airflow settings. The method also includes sensing a touch that selects a portion of the graphical element, determining an airflow value that corresponds to the selected portion of the graphical element, and adjusting a fan of the heating, ventilating, air conditioning, or cooling system to produce an airflow corresponding to the airflow value.

DRAWINGS

Figure 5:
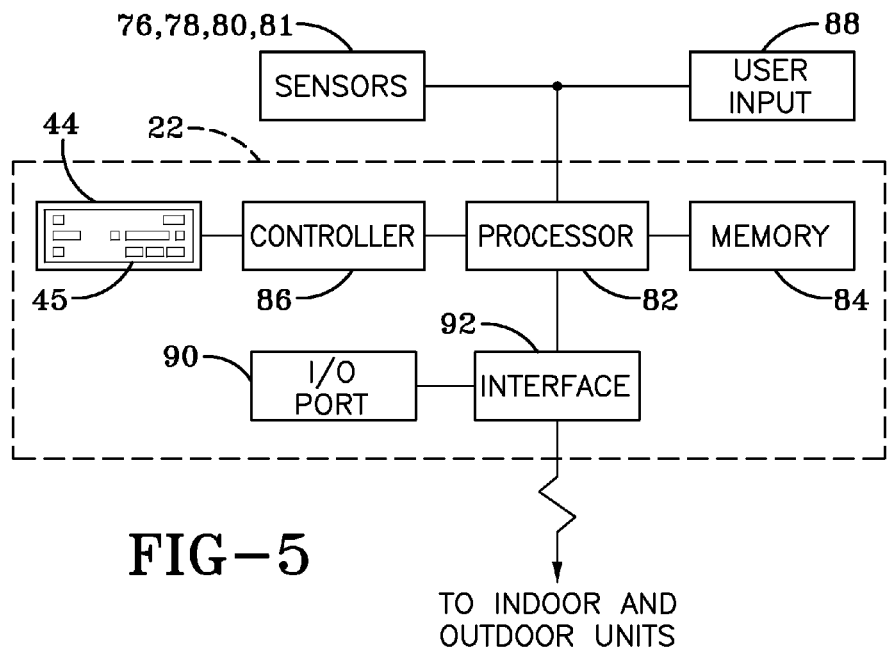
FIG. 5 is a block diagram of an embodiment of a system controller.
Figure 7:
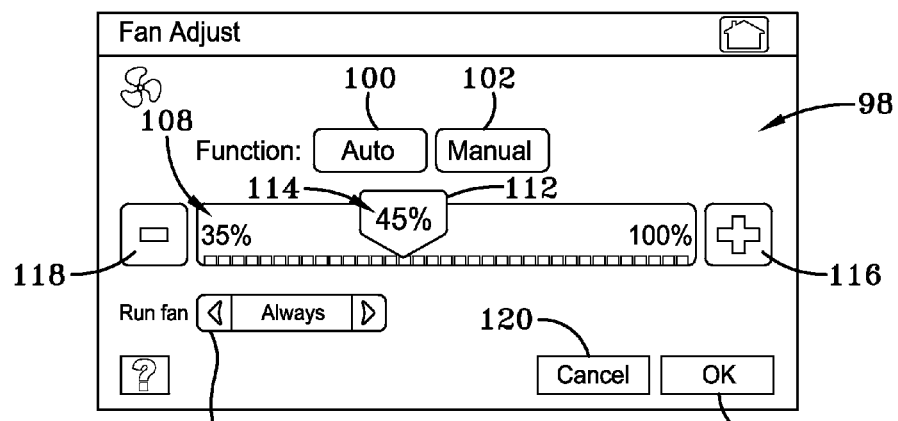

FIG. 7 a view of a screen of the controller of FIG. 5 with a slide bar for adjusting airflow.

Figure 8:
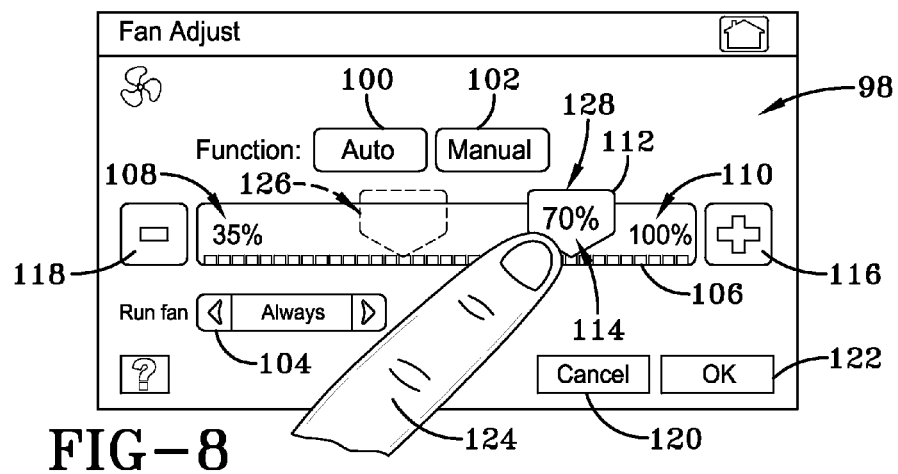

FIG. 8 is a view of the screen of FIG. 7 after an airflow adjustment.

Figure 9:
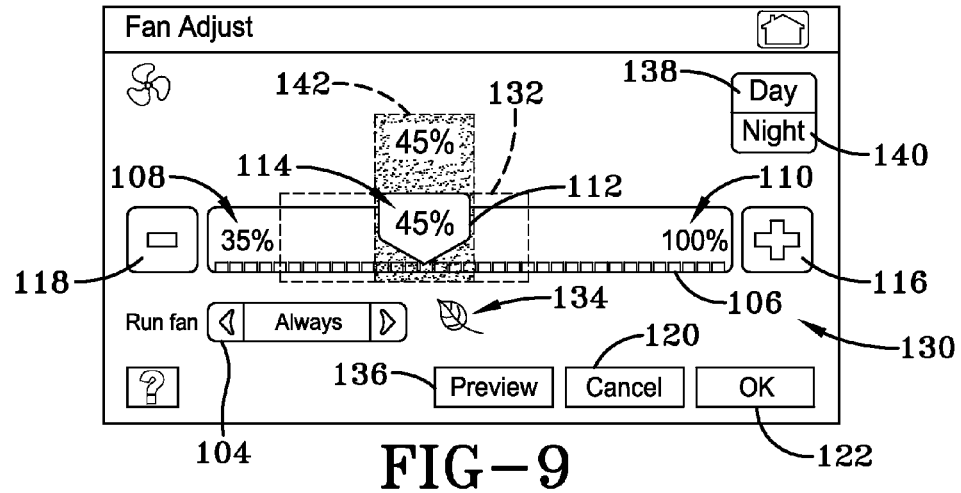

FIG. 9 is a view of another screen of the controller of FIG. 5 with a slide bar for adjusting airflow.

Figure 10:
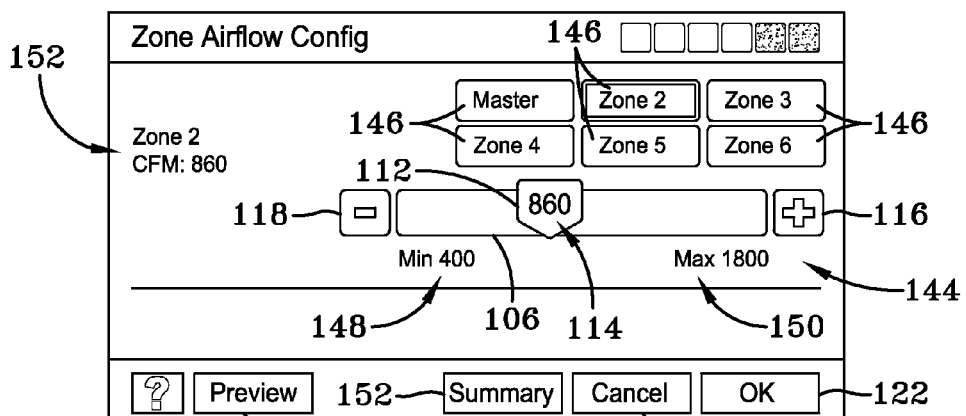

FIG. 10 is a view of a screen of the controller of FIG. 5 that may be employed for zone airflow adjustments.

Figure 11:
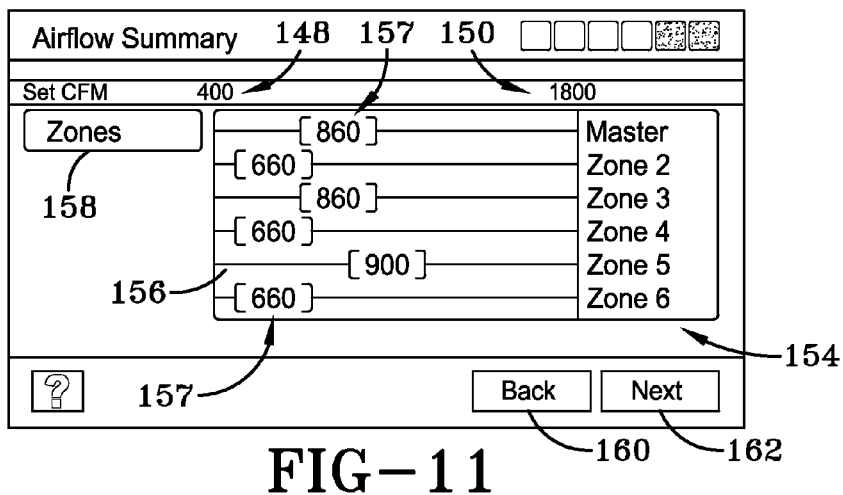

FIG. 11 is a view of another screen of the controller of FIG. 5 that may be employed for zone airflow adjustments.

Figure 12:
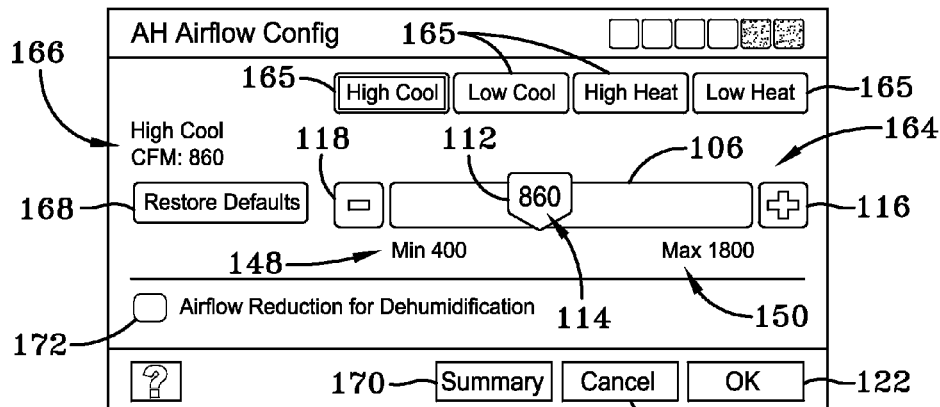

FIG. 12 is a view of a screen of the controller of FIG. 5 that may be employed for operating mode airflow adjustments.

Figure 13:
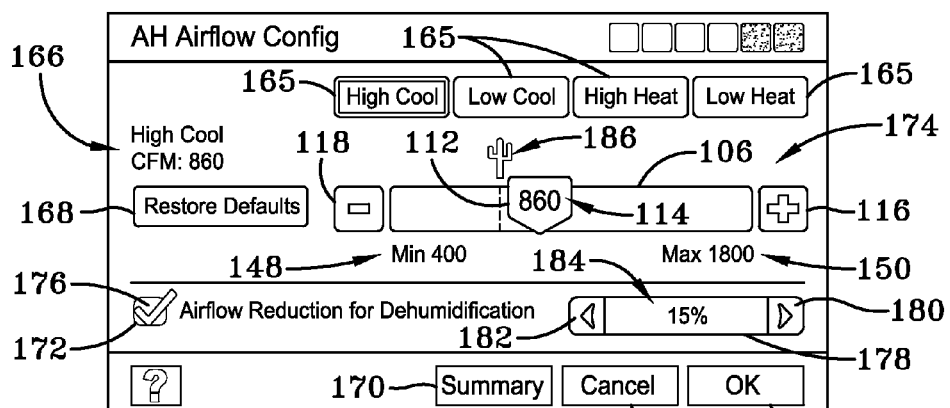

FIG. 13 is a view of another screen of the controller of FIG. 5 that may be employed for operating mode airflow adjustments.

Figure 14:
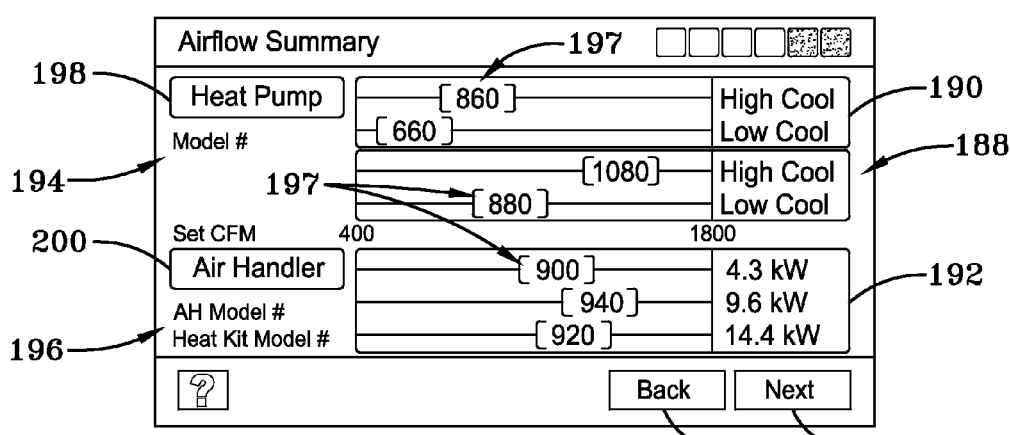

FIG. 14 is a view of yet another screen of the controller of FIG. 5 that may be employed for operating mode airflow adjustments.

Figure 15:
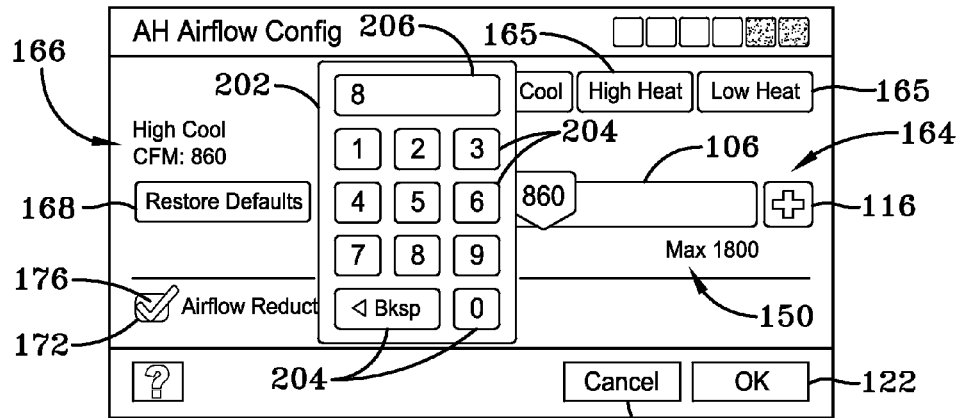

FIG. 15 is a view of a screen of the controller of FIG. 5 depicting an entry keypad.

Figure 16:
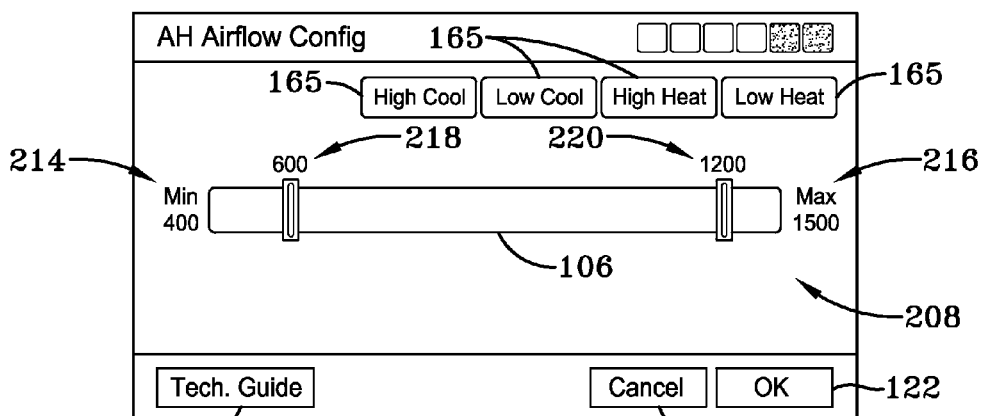

FIG. 16 is a view of a screen of the controller of FIG. 5 that may be employed for adjusting airflow setting ranges.

Figure 17:
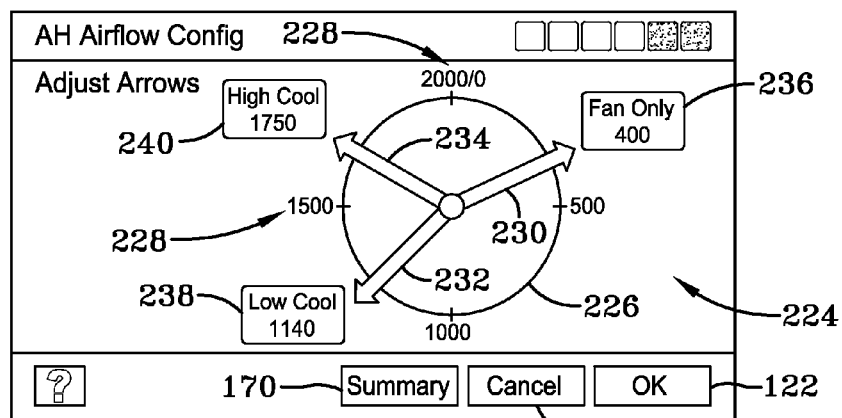

FIG. 17 is a view of a screen of the controller of FIG. 5 with a graphical element for adjusting airflow.

DETAILED DESCRIPTION

The present disclosure is directed to controllers with user interfaces for dynamically adjusting airflow settings. In general, HVAC systems may allow users to vary the airflow produced by the HVAC system. For example, a controller may allow a user to choose between an "Auto" mode where the HVAC system automatically varies the airflow based on the state of the equipment (i.e. running the indoor blower only when the equipment is running) and a "Continuous" or "On" mode where the HVAC system operates the indoor blow continuously regardless of the state of the equipment. The "Continuous" or "On" mode may provide air circulation, and, in certain embodiments, may facilitate the use of indoor air quality (IAQ) equipment, such as an air cleaner.

Rather than providing a single, or reduced set, of airflow settings, the controller may allow a user to select between a substantial number of incremental airflow settings that fall between predetermined minimum and maximum airflow settings. According to certain embodiments, the controller may provide at least 50 incremental airflow settings. However, in other embodiments, the controller may provide at least 5-100 incremental airflow settings, and all subranges therebetween. The large number of airflow setting options may allow a user to adjust the airflow to provide more customized comfort levels, for example, to increase air circulation or to reduce harmonics, rattles, and/or vibrations. To implement the incremental airflow settings, the controller may store the airflow settings as register values in the corresponding control registries. The use of registry values, rather than the use of hardwired jumper or DIP switch settings, may allow an increased number of airflow settings to be provided and easily adjusted through the controller.

Figure 1:
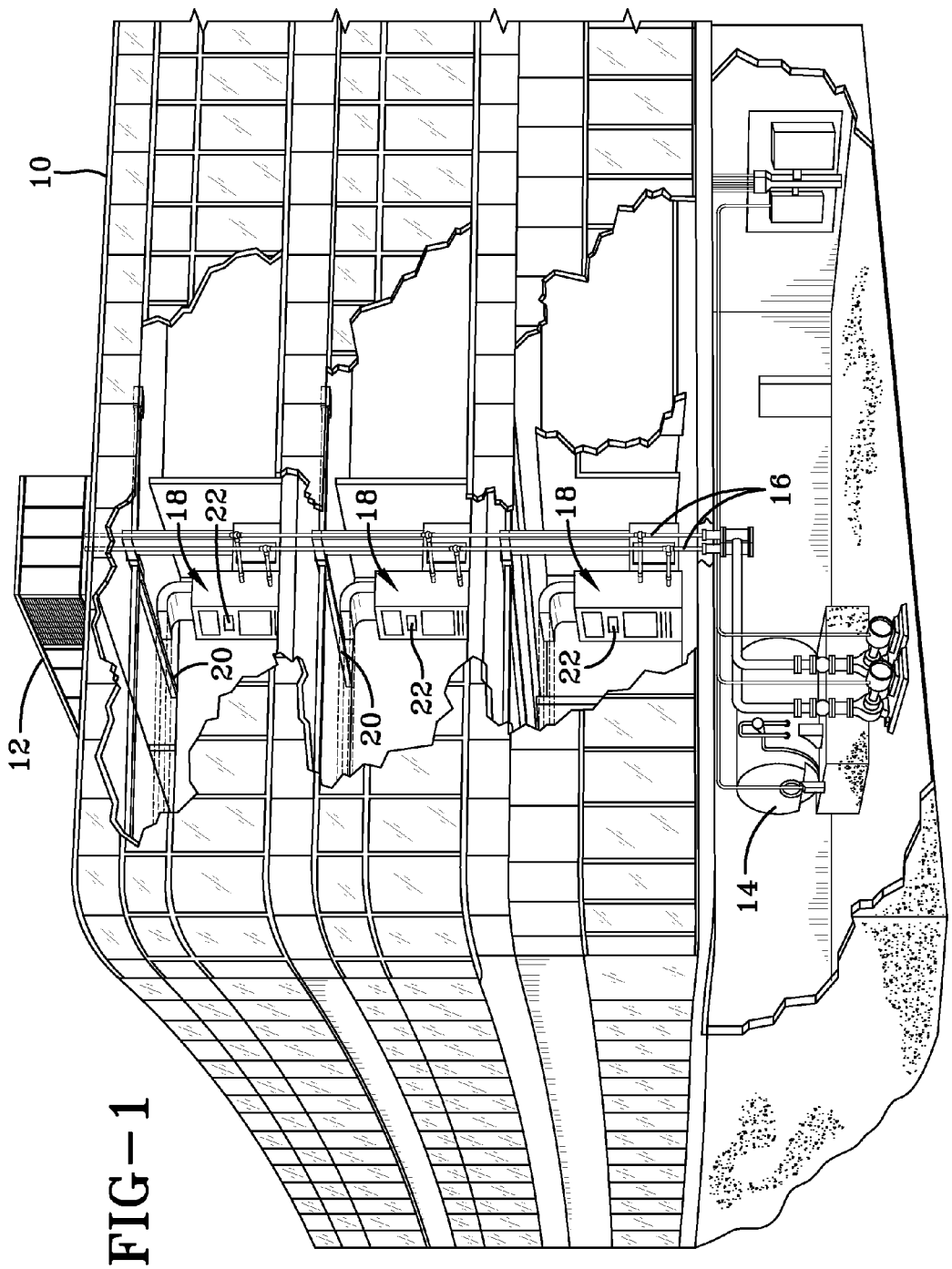
FIG. 1 is a perspective view of an embodiment of a commercial or industrial HVAC system that employs system controllers with user interfaces.

FIG. 1 illustrates an exemplary application, in this case an HVAC system for building environmental management, that may employ one or more system controllers with user interfaces. A building 10 is cooled by a system that includes a chiller 12 and a boiler 14. As shown, chiller 12 is disposed on the roof of building 10 and boiler 14 is located in the basement; however, the chiller and boiler may be located in other equipment rooms or areas next to the building. Chiller 12 is an air cooled or water cooled device that implements a refrigeration cycle to cool water. Chiller 12 may be a stand-alone unit or may be part of a single package unit containing other equipment, such as a blower and/or integrated air handler. Boiler 14 is a closed vessel that includes a furnace to heat water. The water from chiller 12 and boiler 14 is circulated through building 10 by water conduits 16. Water conduits 16 are routed to air handlers 18, located on individual floors and within sections of building 10.

Air handlers 18 are coupled to ductwork 20 that is adapted to distribute air between the air handlers and may receive air from an outside intake (not shown). Air handlers 18 include heat exchangers that circulate cold water from chiller 12 and hot water from boiler 14 to provide heated or cooled air. Fans, within air handlers 18, draw air through the heat exchangers and direct the conditioned air to environments within building 10, such as rooms, apartments, or offices, to maintain the environments at a designated temperature. A controller 22, shown here as including a thermostat, may be used to designate the temperature of the conditioned air. Controller 22 also may be used to control the flow of air through and from air handlers 18 and to diagnose mechanical or electrical problems with the air handlers 18. Other devices may, of course, be included in the system, such as control valves that regulate the flow of water and pressure and/or temperature transducers or switches that sense the temperatures and pressures of the water, the air, and so forth. Moreover, the control device may communicate with computer systems that are integrated with or separate from other building control or monitoring systems, and even systems that are remote from the building.

Figure 2:
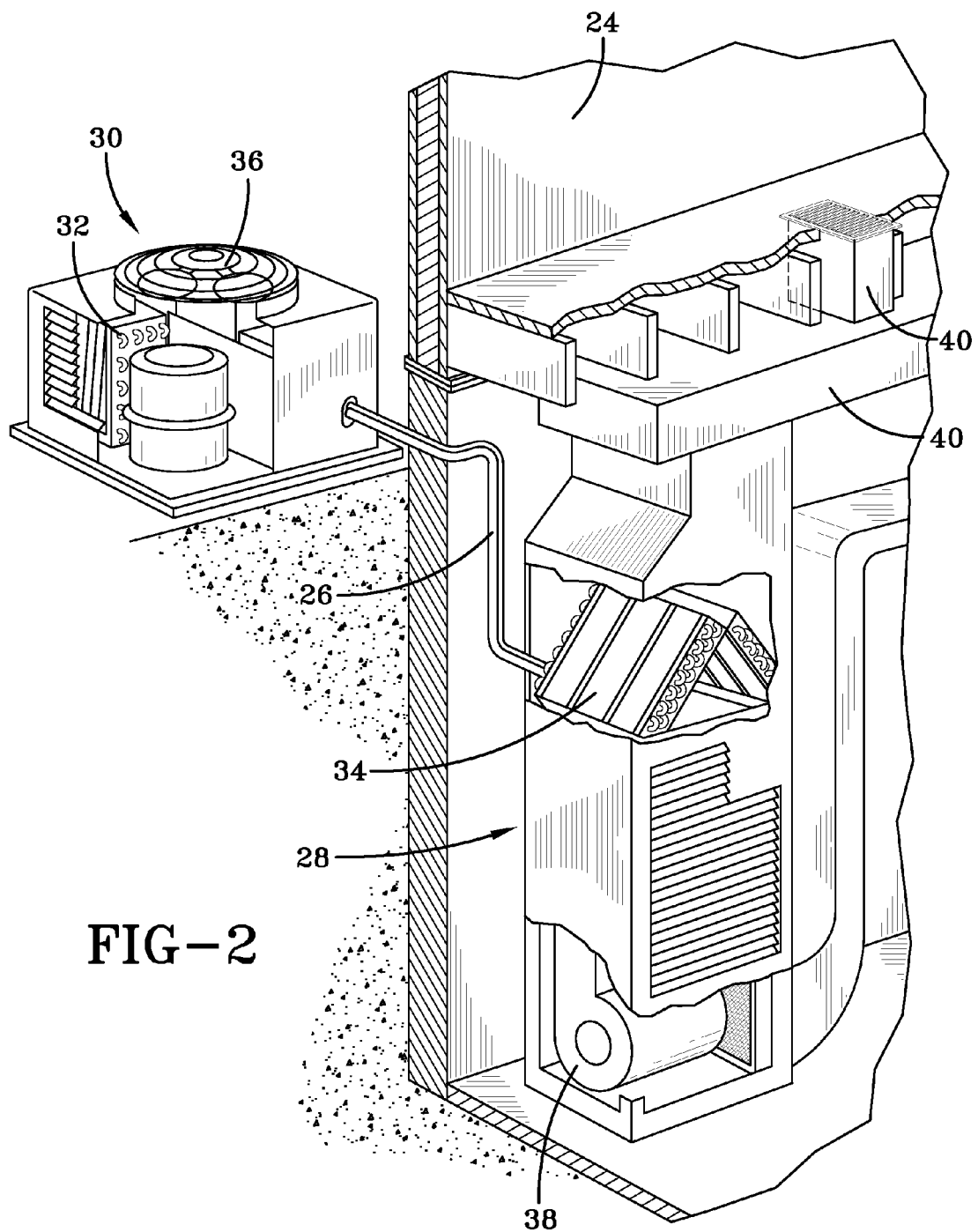
FIG. 2 is a perspective view of an embodiment of a residential HVAC system that employs system controllers with user interfaces.

FIG. 2 illustrates a residential heating and cooling system. The residential heating and cooling system may provide heated and cooled air to a residential structure, as well as provide outside air for ventilation and provide improved indoor air quality (IAQ) through devices such as ultraviolet lights and air filters. In general, a residence 24 may include refrigerant conduits 26 that operatively couple an indoor unit 28 to an outdoor unit 30. Indoor unit 28 may be positioned in a utility room, an attic, a basement, and so forth. Outdoor unit 30 is typically situated adjacent to a side of residence 24 and is covered by a shroud to protect the system components and to prevent leaves and other contaminants from entering the unit. Refrigerant conduits 26 transfer refrigerant between indoor unit 28 and outdoor unit 30, typically transferring primarily liquid refrigerant in one direction and primarily vaporized refrigerant in an opposite direction.

When the system shown in FIG. 2 is operating as an air conditioner, a heat exchanger 32 in outdoor unit 30 serves as a condenser for re-condensing vaporized refrigerant flowing from indoor unit 28 to outdoor unit 30 via one of the refrigerant conduits 26. In these applications, a heat exchanger 34 of the indoor unit functions as an evaporator. Specifically, heat exchanger 34 receives liquid refrigerant (which may be expanded by an expansion device, not shown) and evaporates the refrigerant before returning it to outdoor unit 30.

Outdoor unit 30 draws environmental air through heat exchanger 32 using a fan 36 and expels the air above the outdoor unit. When operating as an air conditioner, the air is heated by heat exchanger 32 within outdoor unit 30 and exits the unit at a temperature higher than it entered. Indoor unit 28 includes a blower or fan 38 that directs air through indoor heat exchanger 34, where the air is cooled when the system is operating in air conditioning mode, and then circulates the air through ductwork 40 that directs the air to the residence 24. The overall system operates to maintain a desired temperature as set by a system controller 22 (FIG. 1). When the temperature sensed inside the residence is higher than the set point on the thermostat (plus a small amount), the air conditioner may become operative to refrigerate additional air for circulation through the residence. When the temperature reaches the set point (minus a small amount), the unit may stop the refrigeration cycle temporarily.

When the unit in FIG. 2 operates as a heat pump, the roles of heat exchangers 32 and 34 are reversed. That is, heat exchanger 32 of outdoor unit 30 will serve as an evaporator to evaporate refrigerant and thereby cool air entering outdoor unit 30 as the air passes over outdoor heat exchanger 32. Indoor heat exchanger 34 will receive a stream of air blown over it and will heat the air by condensing the refrigerant.

Figure 3:
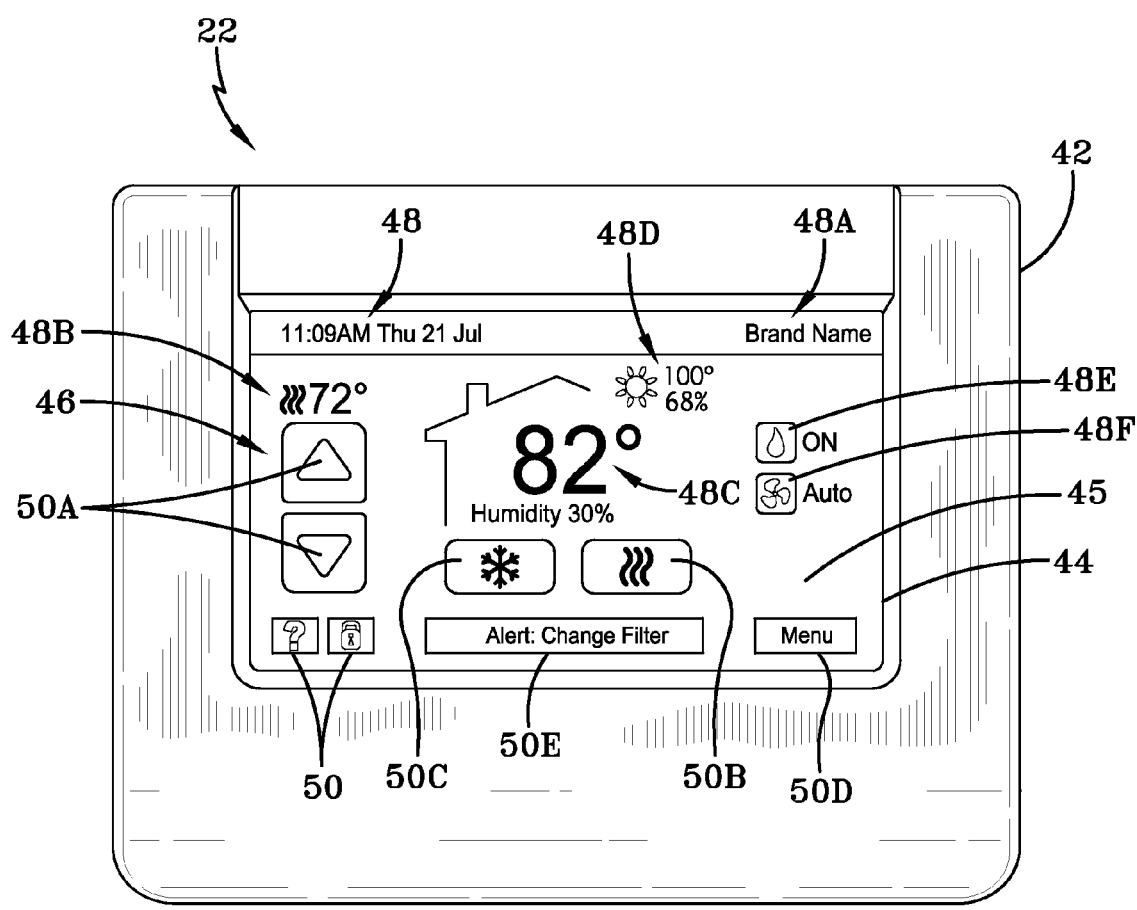
FIG. 3 is a perspective view of an embodiment of a system controller for an HVAC system.

FIG. 3 is a front view of controller 22, shown here as including a digital programmable thermostat. In other embodiments, the controller may be any suitable temperature controller. The controller 22 may be used to control one or more indoor and/or outdoor units. Controller 22 is protected by an enclosure 42 that protects the interior components from physical damage and shields them from environmental hazards such as dust and electromagnetic interference. The enclosure may be formed from any suitable material such as plastic, metal, or a composite material. A display 44 is mounted within enclosure 42 and may be used to display various images and text generated by the device. The display may be any type of display such as a liquid crystal display, a light emitting diode display, an organic light emitting diode display, or other suitable display and may be capable of displaying text strings and/or high-resolution color graphics. Additionally, the display includes a touch-sensitive element, such as a touch screen 45.

Touch screen 45 may receive input from a user's or object's touch and may send the information to a processor within the controller 22, which may interpret the touch event and perform a corresponding action. According to certain embodiments, the touch screen may employ resistive touch screen technology. However, in other embodiments, the touch screen may employ any suitable type of touch screen technology, such as capacitive, infrared, surface acoustic wave, electromagnetic, or near field imaging. Furthermore, touch screen 45 may employ single point or multipoint sensing.

Display 44 may be used to display a graphical user interface (GUI) 46 that allows a user to interact with the controller. GUI 46 may include various layers, windows, screens, templates, elements, or other components that may be displayed in all, or a portion, of display 44. Generally, GUI 46 may include textual and graphical elements that represent applications and functions of controller 22. For example, user GUI 46 may include status indicators 48 that display the status of the system and/or the environment. For example, an indicator 48B may display the operational mode (i.e., heating or cooling) and the temperature set point, an indicator 48C may display the current temperature and humidity, and an indicator 48D may display the weather conditions, among others. In another example, indicators 40E and 40F may display the humidity control status and the fan speed, respectively. In certain embodiments, the status indicators 48 also may include one or more brand indicators 48A that display information identifying the brand of controller 22.

GUI 46 also may include graphical elements 50 that may represent icons, buttons, sliders, menu bars, and the like. Graphical elements 50 may be selected by a user through the touch screen. For example, graphical elements 50A may be selected to increase or decrease the temperature set point. In another example, graphical elements 50B and 50C may be selected to change the system mode between heating and cooling. A graphical element 50D also may be selected by a user to display screens with menus and/or submenus for adjusting system settings and/or operation parameters of the HVAC system. Further, a graphical element 50E may notify a user that maintenance is required and may be selected to obtain maintenance information. As may be appreciated, the types and functionality of the graphical elements may vary depending on system functionality, system settings, and system equipment, among others. Further, in certain embodiments, controller 22 may include physical inputs, such as buttons, wheels, knobs, or the like, for receiving user input instead of, in addition to, or in combination with graphical elements 50.

Figure 4:
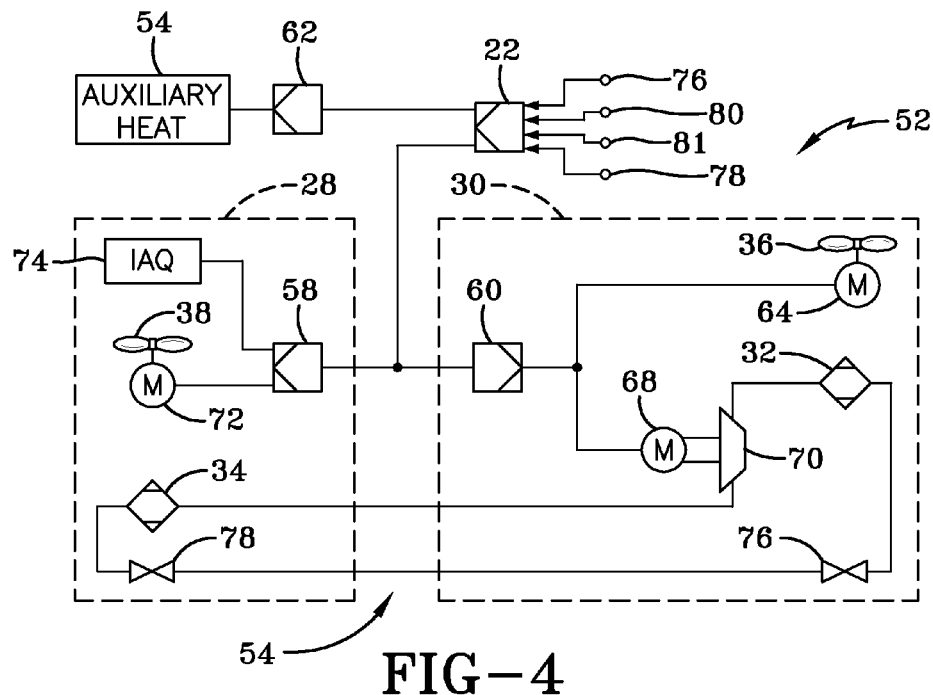
FIG. 4 is a block diagram of an embodiment of an HVAC system that employs a system controller.

FIG. 4 is a block diagram of an HVAC system 52 that includes controller 22, indoor unit 28 functioning as an air handler, and outdoor unit 30 functioning as a heat pump. Refrigerant flows through system 52 within a closed refrigeration loop 54 between outdoor unit 30 and indoor unit 28. The refrigerant may be any fluid that absorbs and extracts heat. For example, the refrigerant may be hydrofluorocarbon (HFC) based R-410A, R-407C, or R-134a. HVAC system 52 also includes an auxiliary heat system 56 that may be used to provide additional heating. For example, auxiliary heat system 56 may include a gas furnace, a fossil fuel furnace, an electric heat system, or the like.

The operation of indoor and outdoor units 28 and 30 is controlled by control circuits 58 and 60, respectively. Further, the operation of auxiliary heat system 56 is controlled by a control circuit 62. Control circuits 58, 60, and 62 may execute hardware or software control algorithms to govern operations of HVAC system 52. According to certain embodiments, the control circuits may include one or more microprocessors, analog to digital converters, non-volatile memories, and interface boards. In certain embodiments, the control circuits may be fitted with or coupled to auxiliary control boards that allow conventional 24 VAC wiring to be controlled through serial communications. Further, in certain embodiments, the control circuits may be controlled through a wireless network.

Control circuits 58, 60, and 62 may receive control signals from controller 22 and transmit the signals to equipment located within indoor unit 28, outdoor unit 30, and auxiliary heat system 54. For example, outdoor control circuit 60 may route control signals to a motor 64 that powers fan 66 and to a motor 68 that powers a compressor 70. Indoor control circuit 58 may route control signals to a motor 72 that powers fan 38. Indoor control circuit 58 also may route control circuits to equipment included within an Indoor Air Quality (IAQ) system 74. For example, IAQ system 74 may include one or more air cleaners, UV air purifiers, humidifiers, and/or ventilators, among others. The control circuits also may transmit control signals to other types of equipment such as valves 76 and 78, sensors, and switches.

Controller 22 may operate to control the overall heating and cooling provided by indoor unit 28, outdoor unit 30, and auxiliary heat system 54. Indoor and outdoor units 28 and 30 include heat exchangers 34 and 32 that function either as an evaporator or a condenser depending on the heat pump operation mode. For example, when HVAC system 52 is operating in cooling (or "AC") mode, outside heat exchanger 32 functions as a condenser, releasing heat to the outside air, while inside heat exchanger 34 functions as an evaporator, absorbing heat from the inside air. When HVAC system 52 is operating in heating mode, outside heat exchanger 32 functions as an evaporator, absorbing heat from the outside air, while inside heat exchanger 34 functions as a condenser, releasing heat to the inside air. A reversing valve (not shown) may be positioned on closed loop 54 to control the direction of refrigerant flow and thereby to switch the heat pump between heating mode and cooling mode.

HVAC system 52 also includes two metering devices 76 and 78 for decreasing the pressure and temperature of the refrigerant before it enters the evaporator. The metering devices also regulate the refrigerant flow entering the evaporator so that the amount of refrigerant entering the evaporator equals, or approximately equals, the amount of refrigerant exiting the evaporator. The metering device used depends on the heat pump operation mode. For example, when HVAC system 52 is operating in cooling mode, refrigerant bypasses metering device 76 and flows through metering device 78 before entering inside heat exchanger 34, which acts as an evaporator. In another example, when HVAC system 52 is operating in heating mode, refrigerant bypasses metering device 78 and flows through metering device 76 before entering outside heat exchanger 32, which acts as an evaporator. According to other exemplary embodiments, a single metering device may be used for both heating mode and cooling mode.

The refrigerant enters the evaporator, which is outside heat exchanger 32 in heating mode and inside heat exchanger 34 in cooling mode, as a low temperature and pressure liquid. Some vapor refrigerant also may be present as a result of the expansion process that occurs in metering device 76 and 78. The refrigerant flows through tubes in the evaporator and absorbs heat from the air changing the refrigerant into a vapor. In cooling mode, the indoor air flowing across the multichannel tubes also may be dehumidified. The moisture from the air may condense on the outer surface of the multichannel tubes and consequently be removed from the air.

After exiting the evaporator, the refrigerant flows into compressor 70. Compressor 70 decreases the volume of the refrigerant vapor, thereby, increasing the temperature and pressure of the vapor. The compressor may be any suitable compressor such as a screw compressor, reciprocating compressor, rotary compressor, swing link compressor, scroll compressor, or turbine compressor.

From compressor 70, the increased temperature and pressure vapor refrigerant flows into a condenser, the location of which is determined by the heat pump mode. In cooling mode, the refrigerant flows into outside heat exchanger 32 (acting as a condenser). Fan 36, which is powered by motor 64, draws air across the tubes containing refrigerant vapor. According to certain exemplary embodiments, the fan may be replaced by a pump that draws fluid across the multichannel tubes. The heat from the refrigerant is transferred to the outside air causing the refrigerant to condense into a liquid. In heating mode, the refrigerant flows into inside heat exchanger 34 (acting as a condenser). Fan 38, which is powered by motor 72, draws air across the tubes containing refrigerant vapor. The heat from the refrigerant is transferred to the inside air causing the refrigerant to condense into a liquid.

After exiting the condenser, the refrigerant flows through the metering device (76 in heating mode and 78 in cooling mode) and returns to the evaporator (outside heat exchanger 32 in heating mode and inside heat exchanger 34 in cooling mode) where the process begins again.

In both heating and cooling modes, motor 68 drives compressor 70 and circulates refrigerant through reversible refrigeration/heating loop 54. The motor may receive power either directly from an AC or DC power source or from a variable speed drive (VSD). The motor may be a switched reluctance (SR) motor, an induction motor, an electronically commutated permanent magnet motor (ECM), or any other suitable motor type.

The operation of motor 68 is controlled by control circuit 60. Control circuit 46 may receive control signals from controller 22. In certain embodiments, controller 22 may receive information from a sensor 76 that measures the ambient indoor air temperature and a sensor 78 that measures indoor humidity. Controller 22 then compares the air temperature to the temperature set point (which may be input by a user) and engages compressor motor 68 and fan motors 64 and 72 to run the cooling system if the air temperature is above the temperature set point. In heating mode, controller 22 compares the air temperature from sensor 76 to the temperature set point and engages motors 64, 68, and 72 to run the heating system if the air temperature is below the temperature set point. According to certain embodiments, sensors 76 and 78 may be located within and/or may be an integral part of controller 22. However, in other embodiments, sensors 76 and 78 may be external devices connected to controller 22, for example, through a wired or wireless connection.

Control circuit 60 and controller 22 also may initiate a defrost cycle when the system is operating in heating mode. When the outdoor temperature approaches freezing, moisture in the outside air that is directed over outside heat exchanger 32 may condense and freeze on the coil. Controller 22 may receive information from one or more sensors 80 that measure the outside air temperature and, in certain embodiments, the temperature of outside heat exchanger 32. These sensors provide temperature information to the control circuit 60 which determines when to initiate a defrost cycle.

Controller 22 also may use temperature information from outdoor temperature sensor 80 to determine when to enable the auxiliary heating system 54. For example, if controller 22 receives a signal from temperature sensor 80 indicating that the outdoor temperature has dropped below a certain set point, controller 22 may disable operation of indoor unit 28 and outdoor unit 30 and enable auxiliary heating system 54. In certain embodiments, HVAC system 52 also may include a sensor 81 that senses the level of fuel within a fuel source for auxiliary heating system 54. For example, auxiliary heating system 54 may be a furnace that uses fuel from a propane tank. In this example, sensor 81 may measure the level of fuel within the propane tank and may provide this information to controller 22. Controller 22 may then determine when to operate auxiliary heating system 54, based at least in part on the fuel information provided by sensor 81. For example, if the fuel level is low, controller 22 may operate indoor and outdoor units 28 and 30 for heating, rather than operating auxiliary heating system 54. Further, in certain embodiments, depending on the outdoor temperature, among other factors, controller 22 may operate the auxiliary heating system 54 in conjunction with indoor unit 28 and outdoor unit 30.

FIG. 5 is a simplified block diagram illustrating various components and features of controller 22 in accordance with one embodiment. The block diagram includes display 36 discussed above with respect to FIG. 3, as well as many other components. As noted above with respect to FIG. 4, the controller 22 may be used to control operation of an HVAC system with one or more indoor and outdoor units, such as indoor unit 28, outdoor unit 30, and auxiliary heating system 54. In certain embodiments, each of the units may include a control circuit communicatively coupled to the controller. However, in other embodiments, only some of the units may include control circuits, and the units without control circuits may be wired to and controlled by control circuits within the other units and/or by the controller. Further, the controller may be employed to control a system with only one unit. For example, an HVAC system may provide only heating using an indoor unit such as a furnace. No outdoor unit may be included and no refrigerant may be involved.

The operation of controller 22 may be controlled by a processor 82 that provides the processing capability for the controller. In certain embodiments, the processor 82 may include one or more microprocessors, instruction set processors, graphics processors, and/or related chip sets. Processor 82 may cooperate with a memory 84 that stores executable and/or machine-readable code, data, and instructions for processor 82. For example, the memory 84 may store look up tables and/or algorithms for GUI 46 (FIG. 3). Memory 84 also may store protocol information and instructions for allowing communication between controller 22 and connected units. The memory may include volatile memory such as random access memory and/or non-volatile memory such as read only memory, flash memory, a hard drive, or any other suitable optical, magnetic, or solid-state computer readable media, as well as a combination thereof.

Memory 72 also may store components of GUI 46 (FIG. 3), such as graphical elements, screens, and templates, that may be shown on display 44. A controller 86 may provide the infrastructure for exchanging data between processor 82 and display 44. According to certain embodiments, controller 86 may be an integrated circuit. Further, controller 86 may exist as a separate component or be integrated into display 44 or processor 82. According to exemplary embodiments, controller 86 may govern operation of display 44 and may process graphics and text for display on display 44. Further, controller 86 may process touch events received through the touch screen of display 44.

Display 44 may display screens of GUI 48 prompting a user to enter a user input 88 through touch screen 45. User input 88 may include a value specifying properties of the HVAC system. For example, a screen may prompt a user to select one of the graphical elements 50 to adjust a temperature set point or to determine the heating or cooling mode. In another example, display 44 may display setup screens prompting a user to input a schedule for the HVAC system.

User input 88 also may be received through an input/output (I/O) port 90. The I/O port may be a serial port, USB port, media card port, IEEE-1394 port, network interface, or other suitable interface configured to receive input from an external device. For example, the I/O port may be a USB port for connecting to a USB drive or flash drive. In certain embodiments, the I/O port may be a wireless interface for connecting to a computer, cell phone, or personal navigation device over a wireless network, such as an IEEE 802.11x wireless network. Moreover, in certain embodiments, screens of GUI 46 may be transmitted through I/O port 90 to an external device, such as a cell phone or computer, to facilitate control of controller 22 through the external device.

A communication interface 92 may transmit information received through I/O port 90 to processor 82. In certain embodiments, communication interface 92 may process data prior to transmitting the data to processor 82. Communication interface 92 also may provide an infrastructure for communicating information from I/O port 90 and processor 82 to the indoor and outdoor units 28, 30, 54, 74 (FIG. 4) within the HVAC system. In certain embodiments, the communication interface may be a serial communication interface including one or more protocols for transmitting and/or receiving communication packets containing control signals. For example, the communication interface may employ one or more protocols such as Modbus, BACnet, DNET, or PROFIBUS (Process Field Bus). In certain embodiments, the communication interface may include a Controller Area Network (CAN) chip for communicating with the indoor and outdoor units, with the auxiliary heating system, and/or with external devices. According to exemplary embodiments, communication interface 92 may employ packet switching to route communication packets to the indoor and outdoor units and to the auxiliary heating system. Further, in certain embodiments, communication interface 92 may communicate with external servers, devices, and/or systems. For example, communication interface 92 may connect through a network to a weather information provider to obtain weather forecast and/or real time information.

Figure 6:
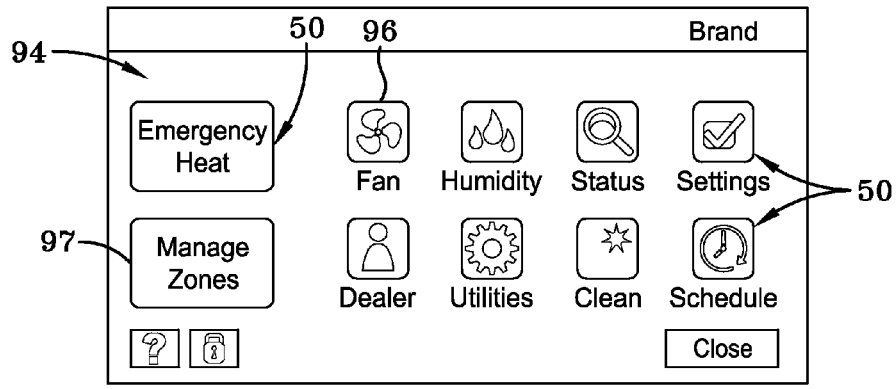
FIG. 6 is a view of a menu screen of the controller of FIG. 5.

FIG. 6 depicts a screen 94 of GUI 46 for changing or initially entering settings of HVAC system 52. Screen 94 includes graphical elements 50 that may be selected by a user through touch screen 45 to display menus for adjusting fan settings, humidity settings, system status settings, general settings, dealer information, utilities, operating schedules, or for cleaning the screen, among others. In certain embodiments, a graphical element 50 also may be selected to enable emergency heat. Screen 94 also includes a graphical element 96 that may be selected to adjust airflow settings. For example, a user may select graphical element 96 to customize airflow settings, and/or to place HVAC system 52 in an automatic fan mode where the HVAC system automatically varies the airflow based on the state of the equipment or a continuous fan mode where the HVAC system operates the indoor fan continuously or at set intervals regardless of the state of the equipment. Screen 94 further includes a graphical element 97 that may be selected to manage zones within HVAC system 52. For example, HVAC system 52 may include electrically controlled dampers that are independently controlled by controller 22 to adjust the airflow to different areas, or zones, within the building. The zones may allow HVAC system 52 to maintain different environmental conditions, such as temperature, humidity, or airflow, within different areas of the building. In certain embodiments, each zone may have a slave controller that communicates with controller 22. Further, in other embodiments, each zone may be controlled by controller 22 with each zone having separate temperature and/or humidity sensors.

In response to selection of graphical element 96, controller 22 may display a screen 98, shown in FIG. 7. Screen 98 includes graphical elements 100 and 102 that may be selected to change HVAC system between an automatic fan mode and a manual or continuous fan mode. As noted above, in the automatic fan mode, selected through graphical element 100, controller 22 may operate the indoor fan based on the state of the equipment. For example, the fan may only run when indoor and outdoor units 28 and 30 (FIG. 4) are operating. Further, in the automatic fan mode, the indoor fan may run at appropriate speeds for achieving heating or cooling and efficiency ratings. In the manual mode, selected through graphical element 102, controller 22 may operate HVAC system 52 with continuous airflow where the indoor fan runs continuously to circulate air.

In certain embodiments, in continuous mode, controller 22 may operate the indoor fan continuously without stopping. However, in other embodiments, graphical element 104 may be selected to set intervals during which the fan runs. For example, through graphical element 104, a user may set the fan to always run or to run for thirty-minute intervals. In the continuous mode, a user may adjust the airflow produced by HVAC system 52 within a minimum and maximum range predetermined by the controller 22. In certain embodiments, the minimum and maximum airflow values may be set by the factory or by an installer based on performance capabilities of the particular equipment installed in the HVAC system. Further, the predetermined minimum airflow settings may be based on the minimum airflows that are required for HVAC components, such as an electronic air cleaner (EAC) included within IAQ system 74 (FIG. 4).

Screen 98 may allow a user to dynamically adjust the airflow when HVAC system 52 operates in the continuous fan mode. Specifically, screen 98 includes a graphical element, such as a slide bar 106 with indicators 108 and 110 showing the minimum and maximum airflow values. The minimum and maximum values may be expressed as flow-related values or as fractional portions, such as percentages, of the maximum airflow. As shown, the minimum and maximum values are expressed as percentages of the maximum airflow. The percentages may allow a user, such as a homeowner, to better understand the adjustments to the airflow settings. That is, it may be easier for a homeowner to understand airflow percentages rather than airflow rate values, such as cubic feet per minute (CFM), cubic meters per minute (CMM), or fan revolutions per minute (RPMs). However, in other embodiments, instead of, or in addition to, displaying the airflow settings as percentages, indicators 108 and 110 may display other types of airflow values, such as CFM or RPM values.

Slide bar 106 may generally represent a range of incremental airflow values that may be selected by a user. The incremental airflow values may be spaced along the range between the maximum and minimum airflow values. According to certain embodiments, controller 22 may determine the maximum and minimum airflow values based on factors such as the equipment models included within HVAC system 52 and installer and/or factory settings. In certain embodiments, tables and/or algorithms correlating HVAC system conditions to maximum and minimum airflow values may be stored within memory 84 (FIG. 5). Further, in certain embodiments, the maximum and minimum airflow values may be received through communication interface 92 and/or through I/O port 90, as shown in FIG. 5. Moreover, according to exemplary embodiments, when percentages are used as the airflow values, the maximum airflow value may be set to one hundred percent.

Controller 22 may determine the maximum and minimum airflow values and then calculate (i.e. via processor 82) incremental airflow settings between the maximum and minimum airflow values. For example, controller 22 may divide the range into one percent increments or 10 CFM increments. In certain embodiments, controller 22 may divide the range into at least 5, 10, 25, 50, or 100 increments. When percentages are used, according to certain embodiments, controller 22 may divide the range into increments of 1, 2, 5, or 10 percent. When CFM values are used, according to certain embodiments, controller 22 may divide the range into increments of 5, 10, 20, or 30 CFM.

Screen 98 includes a moveable graphical element, such as a slider 112 that may be moved along slide bar 106 to adjust the airflow value. Slider 112 may include an indicator 114 that displays the current airflow setting. A user may touch and drag slider 112 along the slide bar 106 until the desired setting is reached. In addition to slider 112, a user may select graphical elements 116 and 118 to increase or decrease the airflow setting. In response to selection of graphical element 116 or 118, slider 112 may move accordingly to reflect the adjusted airflow settings. For example, in response to selection of graphical element 116, controller 22 may move slider 112 to the right to increase the airflow setting by one increment. In response to selection of graphical element 118, controller 22 may move slider 112 to the left to decrease the airflow setting by one increment.

As slider 112 is moved, either through sliding or through selection of graphical elements 116 and 118, indicator 114 may be updated to correspond to the new airflow setting. In certain embodiments, a user may move slider 112 to adjust the airflow setting to optimize comfort, energy consumption, and/or to reduce noise, for example. Upon selection of a new setting, a user may select graphical elements 120 and 122 to cancel or to apply the new setting. Specifically, a user may select graphical element 120 to cancel the changes and return to the prior setting. However, if a user would like to implement the new setting, the user may select graphical element 122 to apply the new setting.

In response to selection of graphical element 122, controller 22 may determine the airflow setting corresponding to selected percentage. For example, as shown in FIG. 5, controller 22 may use lookup tables and/or algorithms stored in memory 84 to correlate the selected percentage to airflow values, such as CFM values. In certain embodiments, processor 82 may then determine a pulse width modulation (PWM) value and send a control signal with this value to the motor. Controller 22 may store the new setting in a corresponding control registry of controller 22. Further, in certain embodiments, the controller may send the registry values to control circuit 58, 60, or 62 for backup storage. For example, controller 22 may send the registry values to control circuit 58 of indoor unit 28, as shown in FIG. 4.

FIG. 8 depicts screen 98 after adjustment of an airflow setting. Specifically, as shown in FIG. 8, a user 124 has moved slider 112 from its original position 126 to a new position 128. User 124 may include a homeowner, installer, or technician, among others. As shown, controller 22 has updated indicator to reflect the new airflow setting value of seventy percent. In certain embodiments, controller 22 may allow adjustment of airflow settings in one percent increments. However, in other embodiments, other increments, for example, ranging from 0.1 to 5 percent, and all subranges there between, may be employed.

In certain embodiments, controller 22 may present airflow adjustment options that guide a user to select an efficient and/or rated airflow. For example, as shown in FIG. 9, a screen 130 may be displayed that includes a shaded section 132 that identifies the most efficient airflow settings. For example, the shaded region may represent the rated airflow at which the HVAC system has been tested to perform at the rated efficiency, for example, 15 SEER. Screen 130 also may include an indicator 134, shown here as a leaf, that appears when the user has set the airflow value within the efficiency range as indicated by shaded section 132. Further, in certain embodiments, controller 22 may produce an audible signal, such as a bell tone, when a user has set the airflow value within the efficiency range as indicated by shaded section 132. In these embodiments, a speaker may be included within controller 22. In certain embodiments, the shaded section 132 may enable an installer to select an appropriate airflow during installation. As described above with respect to FIG. 8, a user may adjust the airflow value through slider 112, slide bar 106, and/or graphical elements 116 and 118.

Screen 130 also includes a graphical element 136 that may be selected to preview the selected airflow setting. In response to selection of graphical element 136, controller 22 may set the airflow speed to the selected setting and run the fan for a brief interval to allow a user to preview the new airflow setting. The preview graphical element 136 may facilitate user selection of an appropriate airflow speed. For example, if a user desires to change the airflow value to reduce a harmonic vibration, a user may preview the new setting to determine whether the new setting has reduced or eliminated the noise.

Screen 130 also includes graphical elements 138 and 140 that may be selected to specify desired airflow values for different programming periods. For example, controller 22 may be programmable to allow a user to specify different temperatures and airflow settings during different times of the day and/or during different days of the week. For example, a user may desire one airflow setting at night when the user is home and another airflow setting during the day when the user is at work.

Screen 130 also may display a shaded section 142 that facilitates user identification of the adjusted airflow setting. For example, as a user drags slider 112 across slide bar 106, shaded section 142 may appear above slide bar 106 with an indicator to show the value which may be currently covered by a users finger.

FIGS. 10 and 11 depict screens of GUI 46 that may be used to adjust airflow settings within zones of HVAC system 52. For example, as shown in FIG. 10, a screen 144 may be displayed that includes graphical elements 146 corresponding to the zones present within HVAC system 52. A user may select one of the graphical elements 146 to display slide bar 106 for adjusting the airflow setting within that zone. As shown, a user has selected zone 2 to adjust the airflow for zone 2. After a zone has been selected, a user may adjust the airflow using slide bar 106, slider 112, and/or graphical elements 116 and 118 as described above with respect to FIGS. 7 and 8. Indicators 148 and 150 may be shown below slide bar 106 to show the maximum and minimum airflow settings. However, in other embodiments, the indicators may be displayed on slide bar 106 as shown in FIGS. 7 and 8.

Screen 144 includes graphical element 120 for canceling the airflow adjustment and also include graphical element 122 for applying the new setting. Further, screen 144 also includes a graphical element 152 that may be selected to display a summary of the airflow settings for each of the zones. Moreover, as discussed above with respect to FIG. 9, screen 144 may include graphical element 136 that may be selected by a user to preview the airflow settings.

FIG. 11 depicts a zone summary screen 154 that may be displayed in response to selection of graphical element 152. Screen 154 includes a window 156 that displays airflow values f157 or each zone. In certain embodiments, values 157 may be selected to display slide bars 106 for adjusting the airflow settings corresponding to each zone. Further, a graphical element 158 may be selected to return to the zone selection screen 144 shown in FIG. 10. Graphical elements 160 and 162 also may be selected to move to other setting screens within the zone menu.

FIG. 12 depicts a screen 164 for using slide bar 106 to adjust the airflow values for particular modes of operation. Specifically, screen 164 includes graphical elements 165 that may be selected to adjust the airflow for particular modes of operation, such as high cool, low cool, high heat, or low heat, among others. In certain embodiments, the particular modes of operation may correspond to compressor operating modes. Further, in other embodiments, the modes of operation may include single stage (W1) or two stage (W2) electric heat. Moreover, in certain embodiments, the modes of operation may include electric heating modes based on different levels of heat, such as 4.3 kW, 9.6 kW, and 14.4 kW modes of electric heating.

As discussed above, with respect to FIGS. 7 and 8, a user may move slider 112 along slider 106 to set new airflow settings. A shown, the airflow values shown by indicators 114, 148 and 150 are shown as CFM values. According to certain embodiments, controller 22 may enable adjustment in ten CFM increments. However, in other embodiments, other CFM increments may be employed, for example in increments ranging from one to fifty CFMs, and all sub-ranges there between. Further, in other embodiments the slide bar 106 may display the adjustments in other units such as percentages or RPMs.

A summary section 166 of screen 164 may enable a user to quickly determine the operating mode and the corresponding airflow value. Screen 164 also includes a graphical element 168 that may be selected to restore the default setting for the selected operating mode. Further, screen 164 includes a graphical element 170 that may be selected to display a summary screen for each operating mode, as discussed below with respect to FIG. 14. Screen 164 also may include a graphical element 172 that enables a user to adjust additional airflow setting, such as an airflow reduction for dehumidification.

As shown in FIG. 13, in response to selection of graphical element 172, a screen 174 may be displayed with an indicator 176 showing that airflow reduction for dehumidification has been enabled. Screen 174 includes a graphical element 180 that may be selected to specify the amount of decrease in airflow when dehumidification is enabled and/or operating for the HVAC system 52. For example, HVAC system 52 may decrease the airflow setting when humidity is detected by indoor humidity sensor 78 (FIG. 4). The decreased airflow may allow more moisture to be removed from the air as it passes over the evaporator. In certain embodiments, the airflow may be reduced by a percentage ranging from one to fifteen percent.

Graphical elements 180 and 182 may be selected to increase or decrease the percentage reduction, and an indicator 184 may display the adjusted setting. Further, an indicator 186 may be shown on slide bar 106 to indicate the dehumidification airflow corresponding to the current airflow setting. This may facilitate visualization of the reduction in airflow that may occur during dehumidification. In certain embodiments, controller 22 may limit the amount of adjustment that may be selected, for example, to prevent freezing of the evaporator coil.

A user also may view a summary of the airflow for each operating mode by selecting graphical element 170. In response to selection of graphical element 170, a screen 188 may be displayed, as shown in FIG. 14. In certain embodiments, screen 188 may display a summary of some or all of the airflow settings in windows 190 and 192. Summary sections 194 and 196 may display additional information about components of HVAC system 52 and may be selected by the user to display additional details about the equipment. Further, each window 190 and 192 displays values 197 that may be selected to view slide bars 106 for adjusting airflow settings corresponding to each operating mode. Graphical elements 198 and 200 also may be selected to view a screen providing slide bars for each setting such as screen 174, shown in FIG. 14 for the heat pump.

Windows 190 and 192 may be particularly useful for communicating the relationships between various airflow settings for each mode of operation. For example, a user may view window 190 to verify that the high cool airflow setting is greater than the low cool airflow setting. In certain embodiments, controller 22 may include limits that automatically adjust a low cool value when a high cool value is reduced to ensure that the low cool airflow setting is below the high cool airflow setting. Further, controller 22 may incorporate other types of relationships between airflow settings for different modes of operation, such as fixed offsets or percentage offsets.

FIG. 15 depicts a keypad 202 that may be employed to adjust airflow settings instead of, or in addition to, using slide bar 106. For example, slider 112 as shown in screen 164 of FIG. 12 may be selected and held down for a period of time to display a keypad 202 as shown in FIG. 15. Keypad 202 includes touch sensitive keys 204 for entering an airflow value, such as a CFM value or a percentage. The entered value may be displayed within a window 206 and a user may select graphical element 122 to enter the adjusted value.

In addition, to or instead of, adjusting airflow values, slide bar 106 also may be used to set an adjustment range within the minimum and maximum airflow values. For example, during installation, an installer may set an adjustment range for a homeowner that ensures that the homeowner may only select airflow values within an efficient operating range. As shown in FIG. 16, a screen 108 allows an installer or technician to set an operating range that is within the overall possible operating range for HVAC system 52. A user may then adjust airflow settings as described above with respect to FIGS. 7 and 8 within the specified range to optimize efficiency, comfort, sound, or performance.

As shown in FIG. 16, a user may access a screen 208 to display slide bar 106 with sliders 210 and 212 that may be moved along slide bar 106 to specify a range within the minimum and maximum airflow values. Indicators 214 and 216 may show the maximum and minimum airflow values that can be delivered by the HVAC system components within controller 22, and a user may move sliders 210 and 212 within the range defined by the maximum and minimum airflow values to create a subrange. Indicators 218 and 220 may be displayed above sliders 210 and 212 to indicate the current value selected by the sliders 210 and 212. Screen 208 also may include a graphical element 222 that may be selected to display technical guide information. For example, the technical guide information may be stored within memory 84 (FIG. 5) and may contain the rated airflow for the HVAC system based at least in part on the indoor unit, the outdoor unit, and/or the auxiliary heating system. By displaying the technical guide information, controller 22 may provide guidance directly on display 45 (FIG. 5) which may facilitate selection of an appropriate subrange.

FIG. 17 depicts another embodiment of a screen 224 for adjusting airflow. Screen 224 includes a graphical element, such as dial 226 that displays a range of incremental airflow settings. Moveable graphical elements, such as selectors 230, 232, and 234 are displayed on dial 226 and may be moved by a user to select airflow values. As shown, dial 226 includes selectors 230, 232, and 234 each corresponding to an operating mode of HVAC system 52. For example, selector 230 may be moved along dial 226 to select an airflow setting for the continuous fan operating mode. In another example, selector 232 may be adjusted to select an airflow setting for the low cool operating mode. Indicators 236, 238, and 240 may be displayed on screen 224 to identify the operating mode corresponding to each selector 230, 232, and 234. Further, indicators 236, 238, and 240 may display the current airflow setting for each mode.

In other embodiments, any number of selectors, such as 1, 2, 3, 4, or the like, may be shown on dial 226, with each selector corresponding to a range of airflow values. Further, in certain embodiments, the ranges may overlap between the selectors. Moreover, in other embodiments, selectors may be displayed for other operating modes, such as electric heating.

In general, the screens depicted in FIGS. 7-17 may be used to adjust airflow settings during heating operations, cooling operations, and/or continuous fan operations. Further, in certain embodiments the airflow may be adjusted for the auxiliary heating system 54 (FIG. 4) and/or for the indoor air quality system 74 (FIG. 4). Further, the screens depicted in FIGS. 7-17 may be used by a homeowner to make adjustments, by an installer during installation, or by a technician during a service call. For example, in some installations, the cooling airflow may need to be adjusted slightly based on site specifications. Further, in other embodiments, slide bars may be used to adjust airflow settings for other airflow moving components within HVAC system 52, such as the outdoor fan motor 64, for example. Moreover, the relative sizes, shapes, and configurations of the graphical elements shown herein may vary depending on system functionality, user preference, and/or system equipment, among others. In general, the slide bars 106 may facilitate adjustment of airflow settings by improving user understanding of the airflow setting and protecting the HVAC equipment through intelligent specification of minimum and maximum airflows based on the equipment that is installed.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A control device comprising:
   a communication interface suitable for operable connection to an indoor unit that directs conditioned air to an environment and at least one of a heat pump, an air conditioner, or an auxiliary heating system;
   a display capable of displaying a maximum airflow setting, a minimum airflow setting, and a range therebetween of incremental settings for the indoor unit;
   a graphical user interface capable of receiving a user input that selects one of the incremental settings; and
   a processor capable of applying the selected incremental setting to the indoor unit through the communication interface to control flow of the conditioned air based upon the selected incremental setting, determining whether the selected incremental setting falls within a predetermined efficiency range, and causing an indicator to be displayed on the display when the selected incremental setting falls within the predetermined efficiency range.

2. The control device of claim 1, wherein the incremental settings comprise fractional portions of the maximum airflow setting.

3. The control device of claim 1, wherein the incremental settings are separated from one another by a predetermined percentage of the maximum airflow setting.

4. The control device of claim 1, wherein the range comprises at least 10 incremental settings.

5. The control device of claim 1, wherein the incremental settings comprise percentages and wherein the processor is capable of converting the percentages to flow-related values.

6. The control device of claim 1, wherein the graphical user interface comprises a screen for selecting a zone controlled by the control device and wherein the processor is capable of applying the selected incremental setting to the selected zone independent of other zones controlled by the control device.

7. The control device of claim 1, wherein the processor is capable of determining the maximum and minimum airflow settings based on model information for the heat pump, the air conditioner, or the auxiliary heating system.

8. A control device comprising:
   a communication interface suitable for operable connection to a heating, ventilating, air conditioning, or cooling system;
   a display capable of displaying a graphical element defining a range of incremental airflow settings extending between a maximum airflow setting and a minimum airflow setting for a unit of the heating, ventilating, air conditioning, or cooling system, and a moveable feature disposed on the graphical element;
   a graphical user interface capable of receiving a user input that moves the moveable feature on the graphical element to select an incremental airflow setting for the unit; and
   a processor capable of applying the selected incremental airflow setting to the unit, wherein the processor is capable of determining whether the selected incremental airflow setting falls within a predetermined efficiency range and wherein the graphical user interface comprises an indicator that is displayed on the display when the selected incremental airflow setting falls within the predetermined efficiency range.

9. The control device of claim 8, wherein the display comprises a touch screen for sensing the user input.

10. The control device of claim 8, wherein the unit comprises an indoor unit or an outdoor unit, and wherein the processor is capable of adjusting a fan speed of the unit based on the selected incremental airflow setting.

11. The control device of claim 8, wherein the graphical user interface comprises a screen for selecting an operating mode of the heating, ventilating, air conditioning, or cooling system, and wherein the processor is capable of applying the selected airflow setting to the selected operating mode.

12. The control device of claim 8, wherein the processor is capable of determining a dehumidification airflow setting based on the selected incremental airflow setting, and wherein the display is capable of displaying an indicator on the slide bar to identify the dehumidification airflow setting.

13. A method comprising:
- displaying maximum and minimum airflow settings for a heating, ventilating, air conditioning, or cooling system and displaying a graphical element representing a plurality of incremental airflow settings between the maximum and minimum airflow settings;
- sensing a touch that selects a portion of the graphical element;
- determining a value that corresponds to the selected portion of the graphical element;
- determining whether the value falls within a predetermined efficiency range;
- causing a first indicator to be displayed in response to determining that the selected incremental setting falls within the predetermined efficiency range; and
- adjusting a fan of the heating, ventilating, air conditioning, or cooling system to produce an airflow corresponding to the value.

14. The method of claim 13, wherein determining a value comprises correlating a percentage of the maximum airflow setting to a volumetric flow rate.

15. The method of claim 13, comprising displaying a summary of current airflow settings for a plurality of zones of the heating, ventilating, air conditioning, or cooling system.

16. The method of claim 13, comprising displaying a summary of current airflow settings for a plurality of operating modes of the heating, ventilating, air conditioning, or cooling system.

17. The method of claim 16, wherein the operating modes comprise a high cool mode, a low cool mode, a high heat mode, a low heat mode, or an electric heating mode.

18. The method of claim 13, comprising determining the maximum and minimum airflow settings based on equipment included in the heating, ventilating, air conditioning, or cooling system.

19. The method of claim 13, comprising displaying a second indicator on the graphical element that identifies the incremental airflow settings that correspond to an efficient operating range for the heating, ventilating, air conditioning, or cooling system.

20. A control device comprising:
- a communication interface suitable for operable connection to a heating, ventilating, air conditioning, or cooling system;
- a display capable of displaying a graphical element defining a range of incremental airflow settings extending between a maximum airflow setting and a minimum airflow setting for a unit of the heating, ventilating, air conditioning, or cooling system, and a moveable feature disposed on the graphical element;
- a graphical user interface capable of receiving a user input that moves the moveable feature on the graphical element to select an incremental airflow setting for the unit; and
- a processor capable of applying the selected incremental airflow setting to the unit, wherein the processor is capable of determining a dehumidification airflow setting based on the selected incremental airflow setting, and wherein the display is capable of displaying an indicator on the slide bar to identify the dehumidification airflow setting.

* * * * *